F. W. LANCHESTER.
CONSTRUCTION AND ROOFING OF BUILDINGS FOR EXHIBITIONS AND LIKE PURPOSES.
APPLICATION FILED MAR. 16, 1920.

1,402,077.

Patented Jan. 3, 1922.
11 SHEETS—SHEET 4.

INVENTOR
F.W. Lanchester,
BY H.R. Kerslake
ATTORNEY

F. W. LANCHESTER.
CONSTRUCTION AND ROOFING OF BUILDINGS FOR EXHIBITIONS AND LIKE PURPOSES.
APPLICATION FILED MAR. 16, 1920.

1,402,077.

Patented Jan. 3, 1922.
11 SHEETS—SHEET 5.

INVENTOR
F. W. Lanchester
BY H. R. Kerslake
ATTORNEY

F. W. LANCHESTER.
CONSTRUCTION AND ROOFING OF BUILDINGS FOR EXHIBITIONS AND LIKE PURPOSES.
APPLICATION FILED MAR. 16, 1920.

1,402,077.

Patented Jan. 3, 1922.
11 SHEETS—SHEET 6.

INVENTOR
F.W. Lanchester,
BY H.R. Kerslake.
ATTORNEY

F. W. LANCHESTER.
CONSTRUCTION AND ROOFING OF BUILDINGS FOR EXHIBITIONS AND LIKE PURPOSES.
APPLICATION FILED MAR. 16, 1920.

1,402,077. Patented Jan. 3, 1922.
11 SHEETS—SHEET 11.

INVENTOR
F. W. Lanchester,
BY H. R. Kerslake
ATTORNEY

UNITED STATES PATENT OFFICE.

FREDERICK WILLIAM LANCHESTER, OF LONDON, ENGLAND.

CONSTRUCTION AND ROOFING OF BUILDINGS FOR EXHIBITIONS AND LIKE PURPOSES.

1,402,077.  Specification of Letters Patent.  Patented Jan. 3, 1922.

Application filed March 16, 1920. Serial No. 366,291.

*To all whom it may concern:*

Be it known that I, FREDERICK WILLIAM LANCHESTER, a subject of the King of Great Britain and Ireland, and residing at 41 Bedford Square, London, W. C. 1, England, have invented certain new and useful Improvements in the Construction and Roofings of Buildings for Exhibitions and like Purposes, of which the following is a specification.

The present invention consists of improvements in the construction and roofings of buildings for exhibitions and like purposes and refers more particularly to an improved construction of roof of a temporary or semi-permanent nature and to improvements in the construction and accommodation of the more permanent or solid parts of the building directed to adapt same to the new type of roof structure.

The present invention consists in brief in a method of building construction in which the roof weight and weight of the walls or wall structure, or at least part thereof, is borne by air pressure and distributed over the whole ground surface of the inclosed or roofed-in area.

The present invention further consists in a building comprising in combination a wall or walled structure and a flexible pressure-supported roof.

The present invention further consists in a flexible dome or other form of roof adapted to be supported by internal air pressure in which the anchorage of the roof tension members is secured by structure (as masonry or concrete or reinforced concrete) of a permanent character forming and formed by the walls, or buildings, or some of them, and a means of supplying air under pressure.

The present invention further consists in a dome or other form of roof in accordance with the preceding clause in which the roof structure comprises a fabric of low permeability to air retained by a network system of roping whose terminal members are adapted to be secured by the anchorage provided and comprising an air lock or equivalent means of ingress and egress appropriate to the purpose for which the building is required.

The present invention further consists in a dome or other form of roof in accordance with either of the preceding clauses in which a retaining rope-work net is provided comprising circumferential members disposed like parallels of latitude and of radial members disposed after the manner of meridians of longitude, the said radial members, which may bifurcate and sub-divide are functionally continuous, and are attached at their outer extremities by appropriate anchorage to the building walls or masonry and are united centrally in common as to a hoop or lantern, for the purpose of retaining and supporting against internal pressure a canvas or fabric envelope of low air permeability.

The present invention further consists in a dome or other form of roof constructed in accordance with either of the preceding clauses in which the masonry construction comprises a number of sections or blocks on independent foundations connected by temporary wood work, masonry or the like, to be readily capable of renewal as a provision against uneven or irregular settlement, and in the case of a dome forming a continuous compression belt to resist the inward tension of the roof members.

The present invention further consists in a dome or other form of roof constructed in accordance with the first or second of the preceding consistory clauses in a reinforced masonry or ferro-concrete construction comprising vertical bars or foundation bolts with or without horizontal or inclined bars for fixing an anchorage member or chains by means of which the roof tension members are secured.

The present invention further consists in a dome or other form of roof constructed in accordance with the first or second of the preceding consistory clauses in the provision of entrance or exit passages having as low a ceiling height as possible adapted to be effectively or approximately blocked or sealed by people making use of the said passages en masse.

The present invention further consists in a dome or other form of roof constructed in accordance with the first or second of the preceding consistory clauses in the details of construction and accessory features hereinafter described.

In erecting a roof constructed in accordance with the present invention, the envelope is laid out on the ground in readiness; the net work or rope system, resembling the web of a spider, is laid thereon with the lantern in the central position and the ropes are attached to their respective lugs. The envelope is then raised to the top of the surrounding wall (buildings, etc.,) from a reinforced belt near its margin and laced to a circumferential rope or eye-bolts arranged to receive it; the margin itself hangs as a curtain against the walls and may be laced thereto to form a pressure tight joint. The air pressure is then admitted and the dome assumes the erected form for which it has been designed.

Referring to the accompanying sheets of illustrative drawings which are diagrammatic and in which like letters refer to like parts throughout.

Figures 13 and 14 and 15 give three views illustrating the detail fitting of the ropework.

In Figure 23 also a large air lock is diagrammatically shown in plan.

Figure 1:
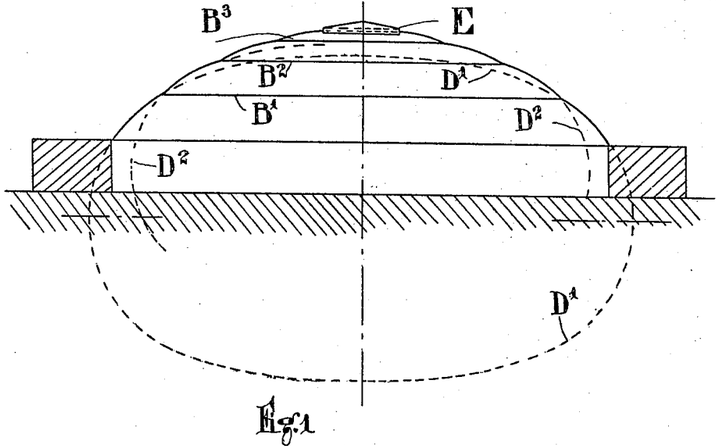
Figures 1 and 2 show in sectional elevation and plan respectively a domed building constructed in accordance with the present invention.
Figure 2:
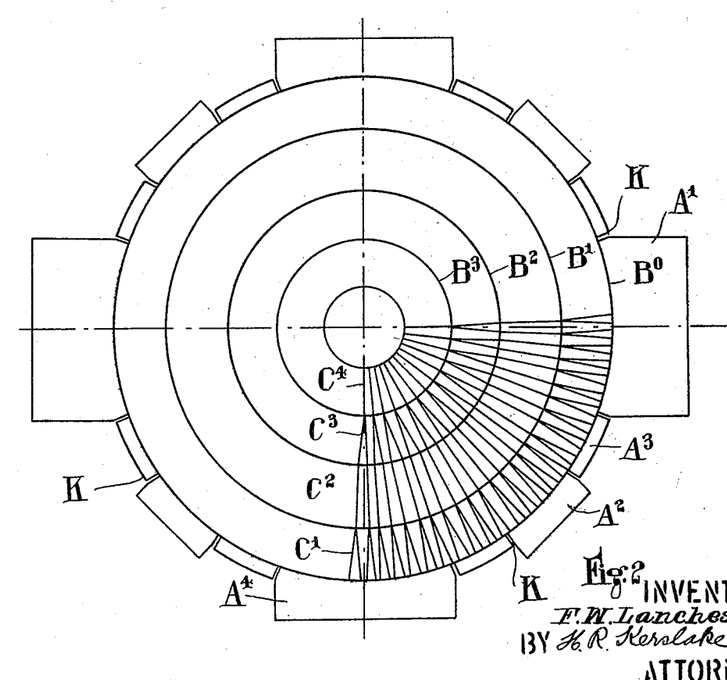

Referring now to the figures in detail the elements or sections of the building illustrated in Figures 1 and 2—$A^1$, $A^2$, $A^3$, $A^4$, etc.—are constructed individually of ferro concrete or masonry and their aggregate weight is sufficient to more than withstand the upward component of the maximum pressure to which the area of the dome is subjected. Where the foundation is sufficiently reliable, or where it has been carried down to an adequate depth, these various sections may be built as one integral structure, but where no adequate foundations are provided and especially in the case of a dome of very large dimensions, say 500 or 1000 feet diameter, the individual sections are built each on its own concrete raft or foundation and separated from its neighbour by sufficient space to allow for any possible irregular settlement; these spaces K between the sections of the ring of buildings being filled with temporary masonry or woodwork. The ropework structure of the dome is anchored, in a manner that will be hereinafter described, to the various sections of the building aforesaid, and whereas the vertical component of the tension due to the pressure within the dome is resisted, as already stated by the weight of the masonry, the horizontal component of the tension, which in the case of a circular dome is radial, is resisted by the ring of building in compression. It is therefore necessary to provide compression blocks in the spaces K, K, between the various members of the building structure adequate to take the circumferential stress in question.

These may take the form of concrete or stone blocks or wedges, or in certain cases alternatively timber blocks or wedges may be employed. The latter are more suitable where considerable settlements or changes of level in the foundations are anticipated.

Figure 16:
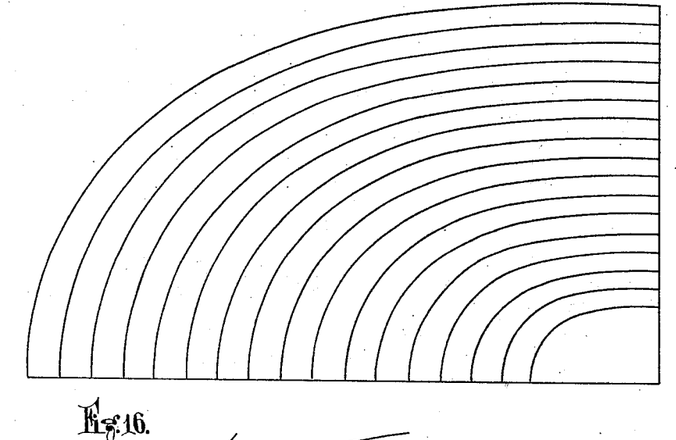
Figures 16 and 17 are illustrative of the means by which the designer may control the shape of a domed roof and Figure 18 is a diagram illustrative of the method by which stress calculations may be made.

The rope network consists of a number of circumferential members, $B^1$, $B^2$, $B^3$, etc., and a number of radial, or approximately radial, members $C^1$, $C^2$, $C^3$, $C^4$, etc. The number of the circumferential members $B^1$, $B^2$, etc., will vary with the size of the dome and the degree to which it is desired to control its form. Since the tension on any set of radial members lying between any two adjacent circumferential members is constant, say the members $C^2$ lying between $B^1$, and $B^2$, the form of the dome between the said circumferential members is determined and it can be shown mathematically to lie on the surface of a solid of revolution approximately defined by the dotted line $D^2$ in Figure 1, and an adjacent annular portion of the dome between the circumferential members $B^1$ and $B^0$ will likewise lie on the surface of a geometrically similar, but larger solid of revolution indicated by the dotted line $D^1$. The form of these curves is more accurately laid out in Figure 16. By varying the length of the radial member $C^1$, $C^2$, $C^3$, $C^4$, etc., or by varying the diameters of the adjacent circumferential members the general form of the dome may be controlled and, although for any given initial angle of slope it cannot be made flatter than indicated by the dotted line $D^1$ (which is the form the dome would assume if no circumferential members other than $B^0$ were provided) it can be built up to any desired altitude that architectural or other considerations may require. The designer may conveniently employ a number of templates of different sizes, such as indicated in Figure 16 as an aid in determining the proportions required for the different lengths of the radial members, and for the positions and lengths of the circumferential ones. The areas between the meshes of the network included between the members $C^1$, $C^2$, $C^3$, etc., and $B^1$, $B^2$, $B^3$, etc., are structurally spanned by the roofing fabric and the latter must be of sufficient strength or be reinforced by small mesh network, or supplementary tension members or "ratlins" may be employed (as described later with reference to Figure 13) to carry the pressure over the maximum of these panel spaces. In order to regulate the width of these panel spaces appropriately each radial member $C^4$ in the annular element next the central lantern E is arranged to bifurcate as indicated at $C^3$ and again as indicated at $C^1$. These bifurcations may be arranged to take place in alternate annular elements or otherwise as may be expedient for the purpose stated.

Figure 3:
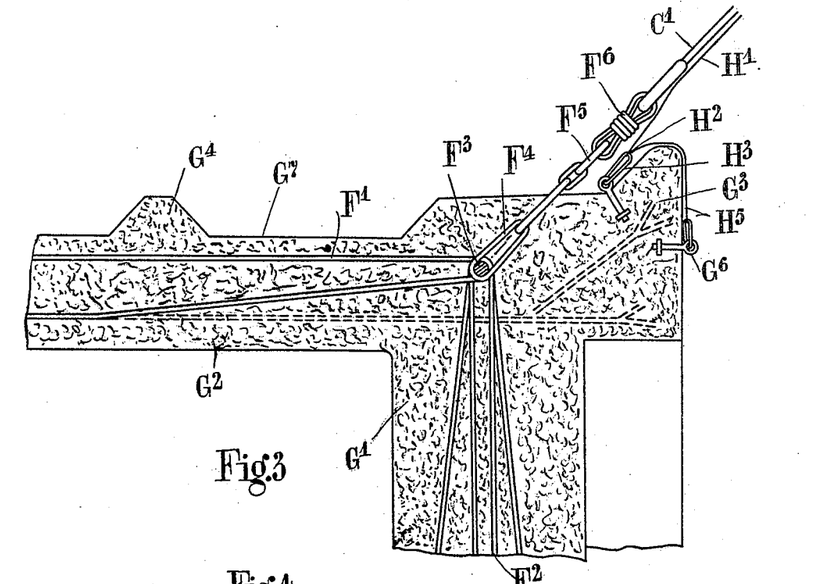
Figures 3 and 4 show in section and plan a method of anchorage of the rope network to the masonry and of the lacing of the fabric roof to secure weather proofness and pressure sealing.
Figure 4:
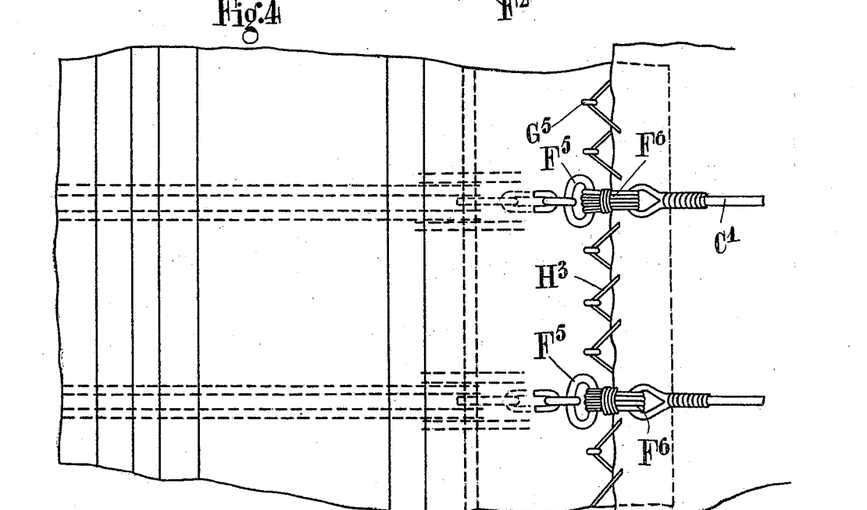

An appropriate method of anchorage of the dome network aforesaid is illustrated in Figures 3 and 4. The concrete walls $G^1$ and roof $G^2$ which form part of the buildings $A^1$, $A^2$, $A^3$, etc., are furnished with iron or steel reinforcements; certain of the bars are of hairpin form, examples being given at $F^1$ and $F^2$, these being brought together in the manner indicated to secure the bar or rod $F^3$ arranged circumferentially to the building. These bars $F^3$ in turn serve as an anchorage for a chain or equivalent member of which the terminal links are $F^4$ and $F^5$. Four links are shown. These chains are arranged to correspond with the terminal radial members $C^1$ to which they may be conveniently attached by lanyards $F^6$ or rigging screws thereby enabling the tension to be adjusted. The roof structure $G^2$ is furnished with upward projections $G^3$ and $G^4$, the space between which forms a rain water gutter and the roof fabric $H^1$ is arranged with a fold at $H^2$ held by lacing $H^3$ and eye-bolts $G^5$ set in the concrete masonry. The edge of the fabric or flap $H^5$ is brought down inside the wall and laced to eyebolts $G^6$. This flap serves to secure pressure sealing. It will be seen that the drainage from the roof fabric $H^1$ is delivered well beyond the lip of the concrete projection $G^3$ and carried away by the rain water gutter $G^7$. The down spouts may be conveniently arranged at the extremities of each component between the blocks $A^1$, $A^2$, $A^3$, etc., leading to a drainage system laid below the ground level.

Figure 5:
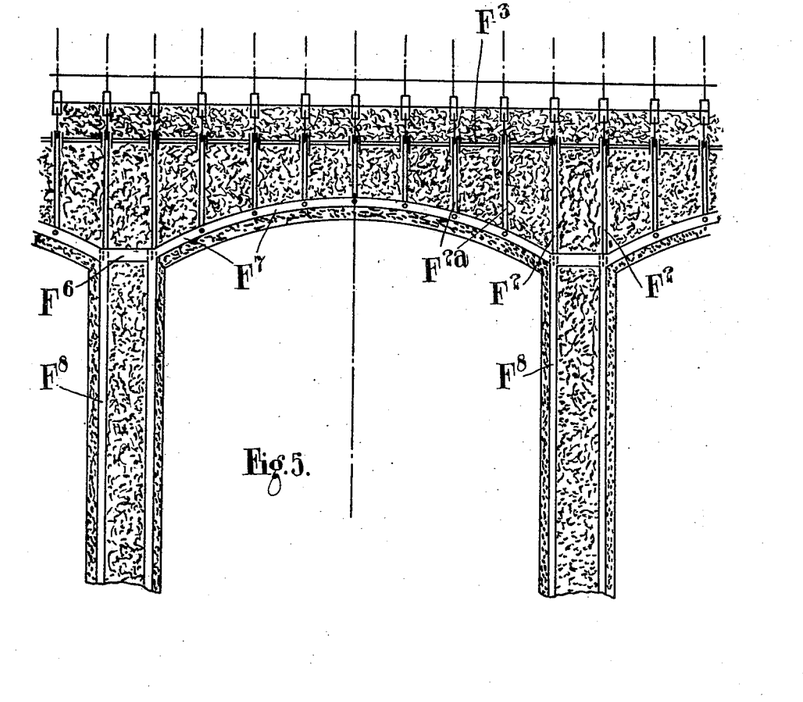
Figure 5 illustrates in sectional elevation the arrangement of the bar work or reinforcement to support the dome anchorage where apertures or doorways are required in the inner wall of the building.

The arrangements of the bars $F^2$ in Figures 3 and 4 requires that the wall $G^1$ should be continuous, at least for a considerable depth below the eaves. There are cases where this is objectionable as for example when it is wished to provide for an entrance lock of considerable size, or again where an upper tier of sunk boxes is required to be a feature of the auditorium. In such cases the construction is modified in the manner indicated in Figure 5 where the bars $F^2$ and $F^{2a}$ are coupled to a bar or linkage system $F^6$ $F^7$ and anchored vertically to heavy bars $F^8$ which may form foundation bolts embedded in the pillar structure separating one aperture from its neighbour. Between pillar and pillar an arched member or catenary bar or chain $F^7$ is provided to which the intermediate anchorage bars $F^{2a}$ are bolted or riveted. The bars $F^2$ and $F^{2a}$ in Figure 5 serve to locate the circumferential bar $F^3$ to which the anchorage chains attach as in Figure 3.

Figure 6:
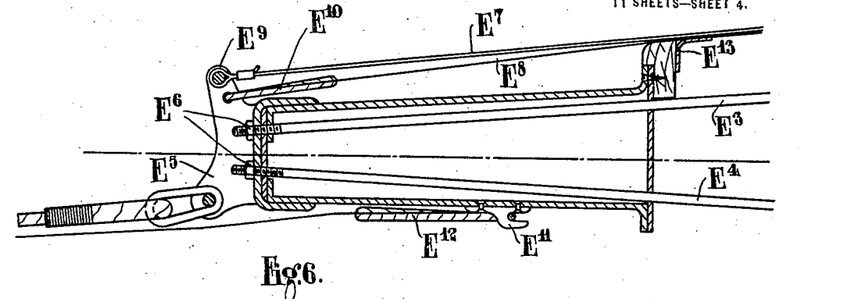
Figures 6 and 7 give in section and plan (part section) respectively the construction of the rim of a lantern to occupy the central portion of the dome in accordance with the present invention.
Figure 7:
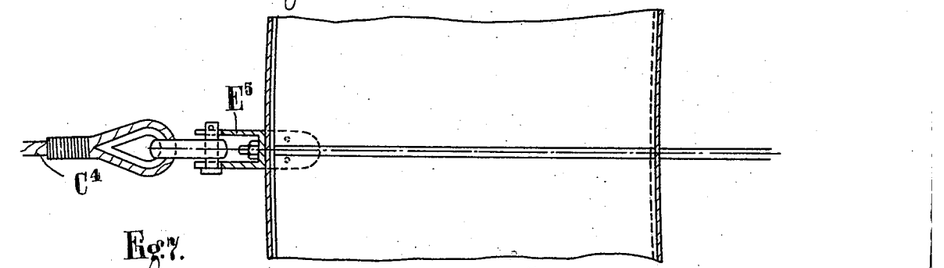

The central lantern E Figure 2 which serves as an anchorage for the inner radial members $C^4$ is shown in detail in Figures 6, 7, 8, 9 and 10. Its general construction resembles that of a wire wheel as apparent from Figures 8 and 9 of which 8 is a part section and 9 a part plan. Here a central hub of drumlike form $E^1$ and rim $E^2$ are connected by an upper and lower set of radial construction spokes $E^3$ and $E^4$ which form together the structure of the lantern. The radial rope members $C^4$ connect to the lugs $E^5$ which may be conveniently arranged in line with the pairs of construction spokes $E^3$, $E^4$ each to each. The vertical and horizontal sections of the rim given in Figures 6 and 7 serve to better illustrate the details of construction. The bracket $E^5$ may be designed to receive the nuts $E^6$ by which the spokes are tensioned. An additional set of spokes $E^7$ is provided to contain the covering fabric $E^8$, the spokes $E^7$ being carried off an extension of the bracket $E^5$ by the pin $E^9$ the fabric being drawn taut by lacing $E^{10}$ from the same extension. The main dome fabric lying beneath the radial rope members $C^4$ is laced to lugs $E^{11}$ by a lacing $E^{12}$. The lantern fabric $E^8$ is furnished with a sealing strip $E^{13}$ to prevent air leakage. The rim element of the lantern $E^2$ may be made in steel of a box section as shown in Figures 6 and 7 or it may alternatively be constructed of wood after the manner indicated in Figure 10.

Figures 8, 9:
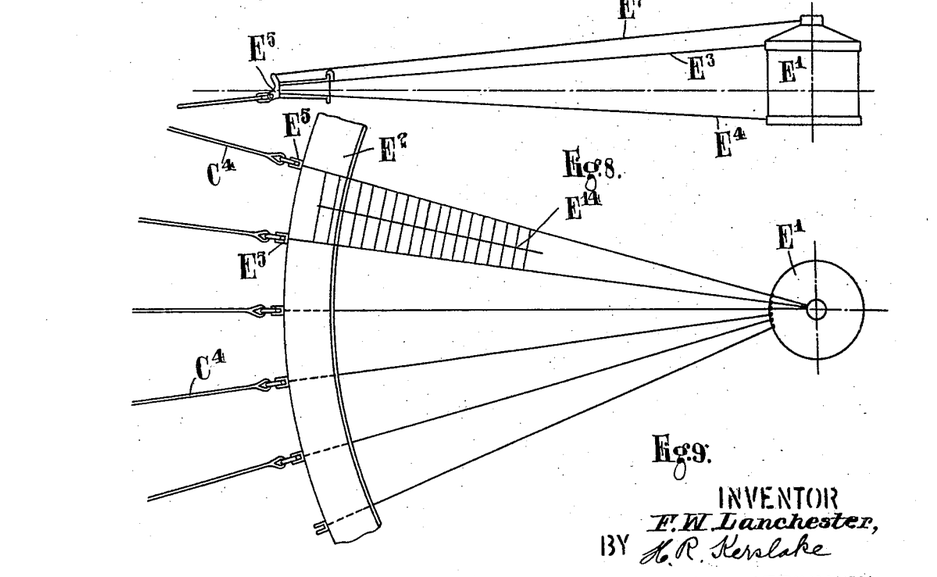
Figures 8 and 9 represent in section and plan a portion of the said lantern to a smaller scale. These figures illustrate a manner in which the network of the dome structure is attached to the lantern aforesaid, also provision for so applying the roofing fabric and the lantern fabric as to secure drainage.
Figure 10:
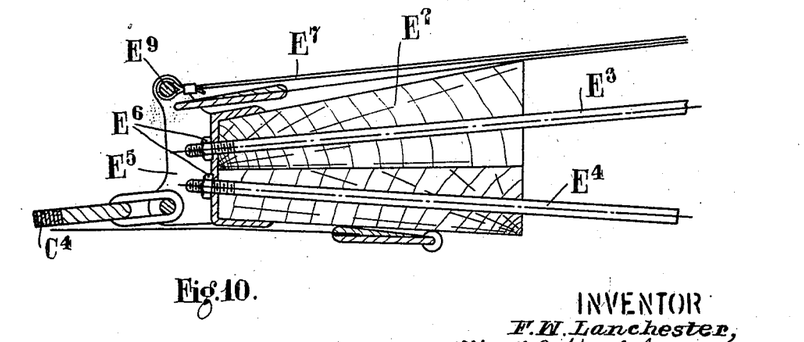
Figure 10 represents in section an alternative construction of rim.

The lantern fabric $E^8$ may be transparent or translucent, for example oiled silk may be employed, the fabric itself being given additional support by network or additional wire members radial or circumferential or both, as indicated at $E^{14}$, Figure 9. Alternatively portions or the whole of the lantern may be glazed in the usual way either with light-weight glass or celluloid.

Figure 11:
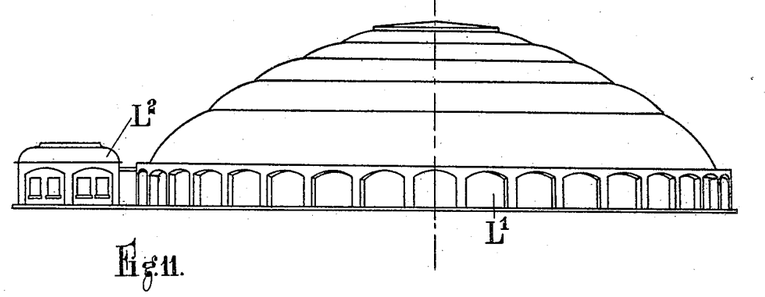
Figures 11 and 12 represent an elevation and plan the application of a domed roof constructed in accordance with the present invention to a covered lawn-tennis court, the dome as shown being in the region of 160 feet diameter.
Figure 12:
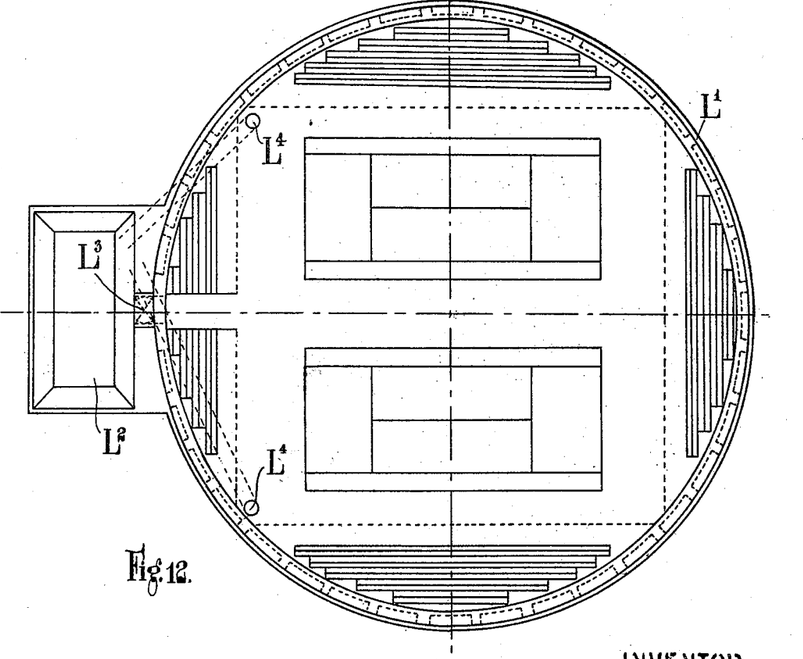

An example is given in Figures 11 and 12 of the application of the present invention to a certain definite purpose with some indication of a possible architectural treatment, and represent a covered lawn tennis court in which the construction comprises a buttressed concrete wall $L^1$ carrying a pressure supported dome or about 160 feet diameter; a subsidiary building of ordinary construction $L^2$ containing the power plant and fan, offices, entrance, turnstile, etc.; a "squirrel cage" air lock (such as commonly fitted to hotels and public buildings) $L^3$ providing ingress and egress to the enclosure. The enclosure is shown in plan as providing two double tennis courts and seating accommodation. Air inlets are provided, such as $L^4$ in the floor of the building served by underground conduits from the blowing engine. These conduits are indicated by dotted lines.

The pressure required merely to sustain such a roof as illustrated in Figures 11 and 12 is but a fraction of an inch water gauge and under ordinary circumstances half an inch or an inch water gauge is more than adequate to sustain the roof and impart a sufficient degree of rigidity. The power required depends upon this pressure and upon the volume of air supplied per minute. The latter is determined by the amount of leakage permitted, namely the permeability of the fabric to air under pressure and such accidental leakages as may otherwise exist. There is no difficulty in ensuring that a roof shall be nearly pressure tight, but as it is desirable and necessary to ensure an appropriate degree of ventilation a fabric with a certain degree of permeability is preferred. An expenditure of about one horse power is sufficient to maintain the pressure and secure adequate ventilation for such a building and purpose as that depicted. In the event of the permeability of the fabric being too great it may be diminished by applying dope, paint or varnish either internally or externally and in any case an external coat of weather resisting paint, such as used on the envelope of kite balloons and dirigibles is desirable.

An appropriate system of rope work is shown in greater detail in Figures 13, 14 and 15. Here two adjacent circumferential members $B^1$ and $B^2$ are shown. These are jointed in the manner illustrated, the ends are looped, spliced and served in the customary nautical manner, the loops being coupled by a link consisting of a pair of plate members $M^1$, bolts $M^2$ and sleeves or bushes $M^3$. Each circumferential member may consist of a single length of wire rope so coupled or may consist of more than one length with couplings at appropriate intervals. The radial members $C^1$, $C^2$, $C^3$ which correspond in disposition to those shown in Figure 2, are under normal conditions of much less diameter, the individual tension sustained being many times less than that borne by the circumferential members. The radial ropework conveniently consists of a number of separate elements such as $C^2$, Figure 14 the ends being looped, spliced and served and the looped ends being made big enough to pass over the looped coupling ends of $B^1$, $B^2$, etc. and the ropework thus prepared consists of a number of looped and spliced lengths which can be assembled without any subsequent splicing or skilled workmanship. Effective continuity is given as between $C^1$, $C^2$ and $C^3$ by the points at which these members are attached to $B^1$, $B^2$ respectively being approximately coincident, the looped ends of $C^1$ and $C^2$, and $C^2$ and $C^3$ being brought in close juxtaposition and being held by seizing so as to be incapable of being displaced. In order to control the elements $C^1$, $C^2$ and $C^3$, etc. at points intermediate between their attachment to $B^1$, $B^2$, etc. intermediate lines or ratlins $b$ are provided, these being conveniently of hemp or manila and secured to the elements $C^1$, $C^2$, $C^3$, etc., by a clove hitch or other system of knotting. The ratlins $b$ incidentally serve to better retain and support the roof fabric and they may be arranged more closely than would otherwise be necessary in order to better perform this function.

It has been stated that in a circular dome where no circumferential elements be provided other than $B^0$ in Figure 2 the form of roof is determined by the equilibrium curve assumed by the radial rope elements. Neglecting the deflection due to the weight of the roof itself the equation of this curve is identical with that of an elastic rod bent by a bowstring until its ends are parallel; a form well known to mathematicians is plotted with approximate accuracy in Figure 16 in which a number of plottings are given. The portion of a roof in between adjacent circumferential members may be regarded as belonging to one or another of these curves, the axis OY being understood to coincide with the vertical axis of the circular dome. Thus if it be required to construct a dome of spherical form Figure 17 as for example when using a portion of a dome as an end to a cylindrical roof as in Figures 22, 23, a transparent template or tracing of Figure 16 may be applied, as has been done in Figure 17 to define a series of elements which taken together shall approximate to an arc of a circle. The number of plottings in Figure 16 has been limited for the sake of clearness; if required a number of intermediate curves may be inserted between each adjacent curve given in the figure. With such a template any desired form within reason may be given to the circular dome and the lengths and positions of the radial and circumferential members may be prescribed with ease and approximate accuracy. The principal stress calculations in the design of a dome in accordance with the present invention relates to the determination of the tensions on the different radial and circumferential elements. The equations for this are simple and may be given with reference to Figure 18.

Figures 17, 18:
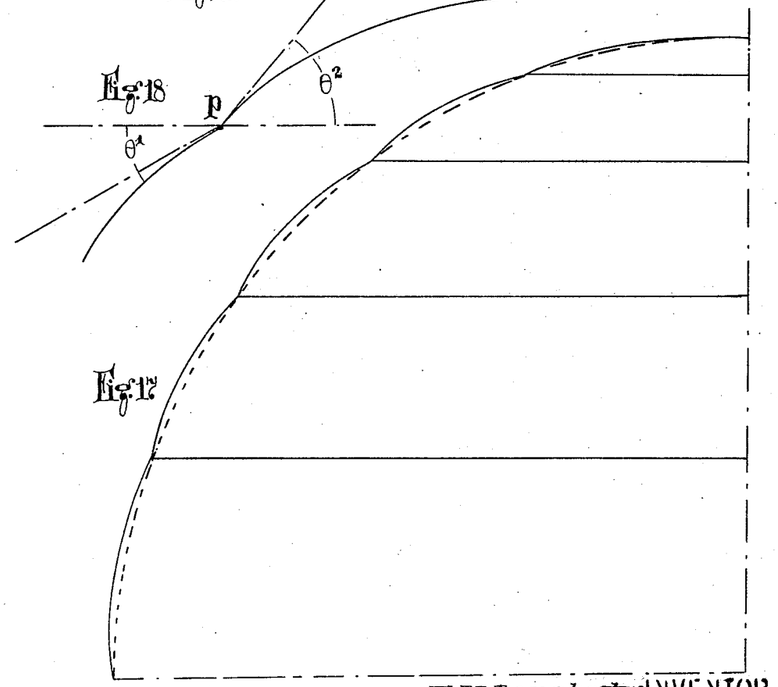

Let $r$ be the radius of the point $p$ from the axis OY.

Let $\theta_1$ and $\theta_2$ be the angles made by the radial elements as in Figure 18.

Let $n$ be the number of radial members.

Let $P$ be the air pressure in pounds per square foot then

Tension on each radial member in pounds $$= \frac{\pi r^2}{n \sin \theta} x P$$

and on the circumferential member $$= r^2 \frac{(\cotan \theta_1 - \cotan \theta_2)}{2} x P$$

Figure 19:
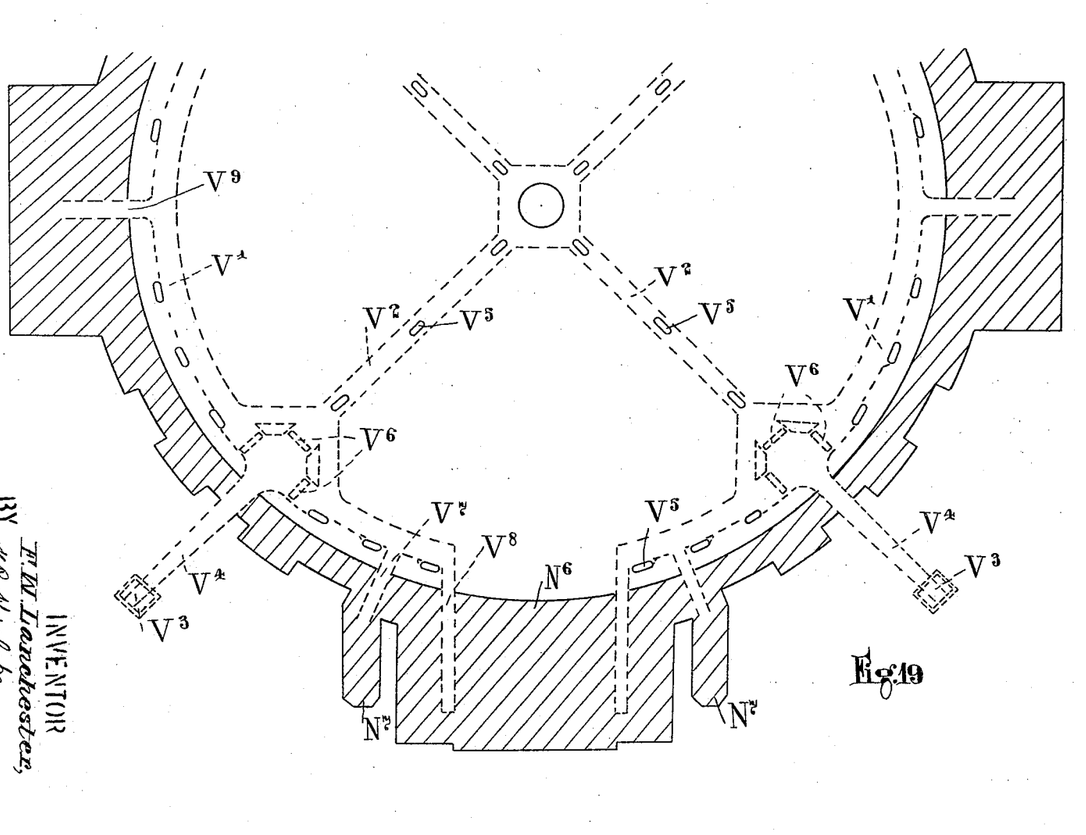
Figure 19 represents in block plan a large exhibition hall and shows more particularly details relating to the air supply and ventilation system.
Figure 20:
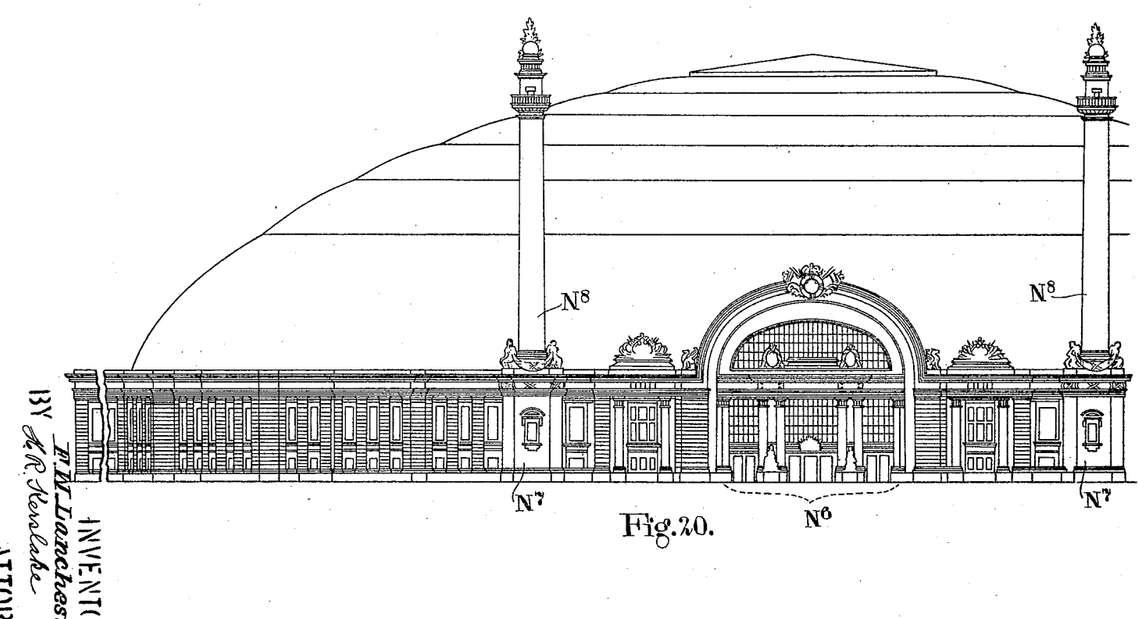
Figure 20 is a part elevation of the same building showing an appropriate architectural treatment.

Figures 19 and 20 represent in part plan and elevation a large circular domed exhibition hall and Figure 19 more particularly illustrates the air pressure and ventilation system. The diameter of the dome contemplated in this design is in the region of 600-feet.

In Figure 19 airways or culverts are provided underground by cut and cover as indicated by dotted lines. The system comprises a circumferential channel $V^1$ and radial channels $V^2$. Air is fed to the distribution system from fans or blowers $V^3$ through expanding conduits $V^4$. The air may be delivered to the building through gratings or through a number of shafts $V^5$ $V^5$ projecting some few feet above the ground level, the latter being preferable as not tending to throw up dust. In order that the incoming air may be warmed heaters may be provided as indicated at $V^6$, as shown; these as illustrated are intended to be of honeycomb type heated by exhaust steam.

In a building such as that under consideration a large proportion of the building proper is required for various services such as exhibition booths, offices, etc., which require to be in free communication with the domed area. These therefore form part of the pressure system and are furnished with ventilation conduits represented diagrammatically by $V^7$ $V^8$ and $V^9$. Ventilation egress from the building is provided by percolation through the fabric dome and by leakage and when desired by regulated apertures from the subsidiary halls, offices, etc. In cold weather when the heating apparatus is in action it is so regulated that the air is delivered to the dome at approximately the temperature which it is required to maintain. It is one of the advantages of the present system of roofing that there are no down draughts of cold air and that there is no loss of heat other than the actual warm air lost by percolation through the roof. In roofing of ordinary construction heat requires to be delivered to the building sufficient not only to allow for the loss by hot air passing away through windows or other outlet channels but also to reheat air which has been cooled by contact with the roof, and it is well known that down draughts of cold air are commonly experienced. In a roof constructed in accordance with the present invention the egress of air necessary to permit of appropriate ventilation takes place by percolation through the roof fabric, and there is no other loss than that of the heat carried away by the air in the act of leakage. In other words it is the air chilled by contact with the roof that passes out and thus the roof acts as though it were a perfect non-conductor of heat. From the above it follows that the heating capacity required for the dome portion of the building may be calculated from the volume of air deemed necessary for the purpose of ventilation and from the temperature rise which is desired.

The scheme as exemplified in Figures 19 and 20 comprises the usual necessities such as booths or offices $N^1$ (Figure 21) communicating with the domed inclosure, refreshment bars as $N^2$, dining halls, etc., indicated by $N^4$, $N^3$, $N^4$ staircases giving access to gallery accommodation such as $N^5$ a grand entrance $N^6$ (Figures 19 and 20), boiler and power houses $N^7$ with chimneys of decorative character $N^8$. The power houses serve to generate current to supply the electrically driven fans $V^3$ and for lighting and power purposes within the hall, and waste steam is used when required in the heating apparatus $V^6$.

In a building of the size in contemplation the foundation question becomes important and the advantage of the flexible roof as tolerant of small degrees of settlement is the more manifest. Relating to Figure 21 it will be seen that the various sections of the building, such as those comprising accommodation $N^1$ and $N^2$ and the lesser blocks between these, may each be built on its own foundation independent of its neighbour with intervening spaces $K^1$, $K^1$ filled with temporary masonry or woodwork, likewise the large block comprising sections $N^4$, $N^3$, $N^4$ will be built on its own foundation or raft separated from the adjacent buildings by spaces $K^2$, $K^2$; likewise filled with temporary masonry. As in the previous description an adequate abutment of a solid character is provided between the inner walls of the different sections, more especially at the upper belt containing the roof anchorage, in order to take the inward component of the roof tension, but this is only necessary to the extent that the buildings themselves may be inadequate to individually stand the strain. The drainage of each roof section is conveniently made independent of its neighbours and the down spouts or conduits may be conveniently housed within the spaces $K^1$, $K^2$, etc., and carried to a drainage system laid underground.

Figure 21:
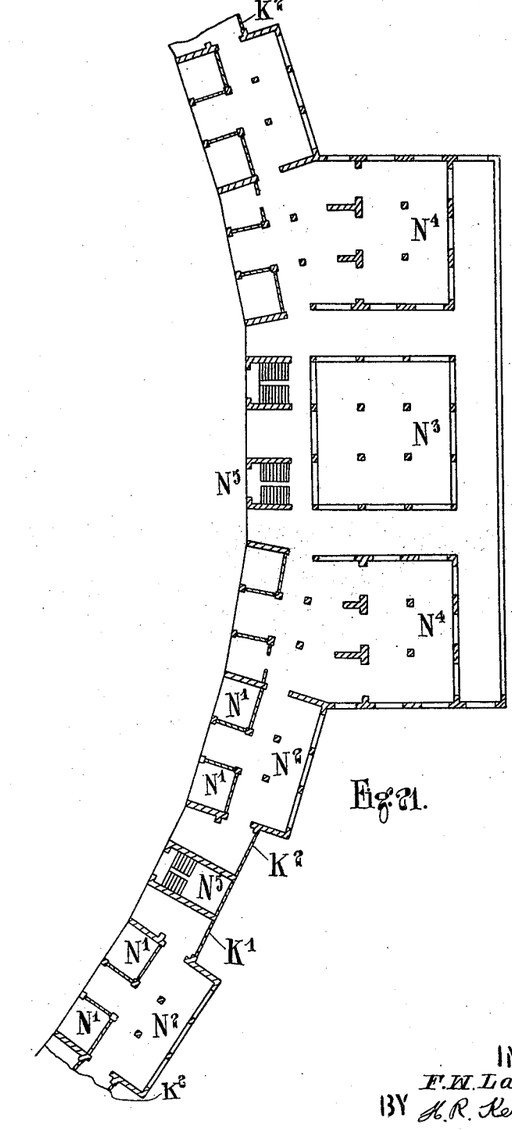
Figure 21 is a portion of the same building in detailed plan showing by way of example provision for offices, exhibition booths, staircases and restaurant or other accommodation.

In the design illustrated in Figures 19, 20 and 21 a large air lock may be conveniently arranged in the building section diametrically opposite that containing the grand entrance $N^6$, the construction of such a lock will be described with reference to a later figure.

The emergency exit forming a subsidiary part of the present invention may be provided in accordance with the requirements of the authorities at as many points as desired, any block section of the building being adaptable to this purpose. The construction of emergency exit, which does not require to be illustrated by drawings is in brief as follows:

Each unit of the exit consists in a radial passage of about 7'0" in height, that is to say as low as can be deemed sufficient to avoid fouling the head gear of visitors and of width sufficient for some three or four or more people abreast. Egress is controlled by doors opening outwards at the exit end of the passage and such doors may be so constructed to be released automatically by sufficient pressure from within. Each emergency exit may comprise one or more passages as described arranged parallel and adjacent one to the other. When in use the mass of people leaving by any exit passage is sufficient to prevent any serious escape of pressure air, and the doors of the passages not in use may be closed or as the passages cease to be occupied they may be closed in order to conserve the pressure. In a large hall such as illustrated in Figures 19 and 20 the existence of an aperture of considerable area is not ordinarily a matter of grave importance but the need for conserving the air pressure is proportionately greater for halls of smaller size, the necessity for cutting down the head room to the minimum possible and for controlling emergency exits in such manner as to prevent the undue escape of air consequently requires more care and consideration in a smaller building. An emergency exit may be built to alternatively act as an air lock, an inner set of doors being provided to be used when required but normally to remain open.

An emergency exit built or constructed in accordance with the foregoing description may be used in case of need as a means of entrance for large numbers or masses of people. In such cases control is effected from the inner doors which are not opened until the corresponding passage is crowded to the necessary degree to secure adequate sealing.

In a large hall such as depicted in Figures 19 and 20 it is sufficient for the purpose of ventilation if the measure of the air supply be based on the conventional assumption that the total air is replaced once every three hours or thereabouts even where the number of visitors admitted is up to the full capacity of the hall. The height of the dome is in the region of 200-feet and even were the pressure supply cut off it would take many hours for the dome structure to come to earth. The chances of such an eventuality are remote for it is contemplated in the design there will be four independent electrically driven centrifugal fans any one of which alone is capable of supporting the roof.

But the sustentation of the roof may frequently be effected without the employment of mechanical power. In the event of a wind of some 40 or 50 miles an hour a suitable cowl may be employed facing the wind in the manner of a ship's ventilator to supply air at a pressure of approximately 5-lbs. per square foot, which is more than sufficient to carry the roof weight and impart to it sufficient rigidity to stand up against the wind in question. Small roofs owing to their less weight per square foot area can be sustained on a lower natural wind velocity. It is only possible to use natural wind for the sustaining of a roof so long as the design of the dome is appropriate, namely the dome must be of comparatively flat form and in no part so steep that the fabric becomes vertical or nearly vertical. When it is desired to use natural wind pressure as an auxiliary means of sustaining a roof the collecting cowl requires to be carried at a considerable distance above the ground surface, a vertical shaft or chimney being built of adequate height. The delivery from this shaft may be carried into the building by an independent channel or may be arranged to communicate with the suction side of one of the pressure feeding fans, in the latter case even when the wind is insufficient itself to maintain the roof its pressure will be utilized to minimize the consumption of power required. In applying auxiliary wind inflation to the support of the dome in Figs. 19 and 20 a separate shaft and cowl may be fitted to the intake of each of the four electrically driven fans $V^3$, $V^3$ those for the time being to the windward side of the building being utilized. Valves are fitted to control the ducts $V^4$, $V^4$ adapted to be closed in order to prevent the escape of air by way of the fans and shafts not for the time being in use.

Figure 22:
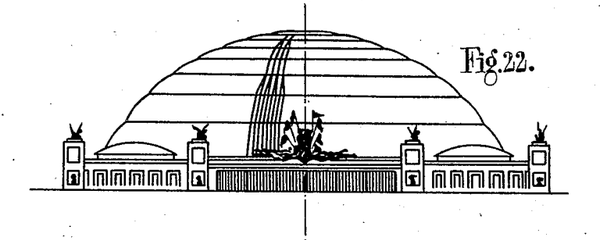
Figures 22 and 23 represent in end elevation and part plan a large exhibition hall of elongate form or stadium with semi-circular ends, the roof being in part approximately cylindrical and in part approximately spherical. Again an appropriate architectural treatment is indicated.

In Figure 22 an exhibition building having a roof of elongate form is exemplified. The roof consists of a cylindrical portion the equilibrium section of which is the arc of a circle and terminal ends of nearly spherical form. The sphere is approximated in the manner illustrated in Figure 17 in order to conform to the equilibrium of figure of the cylindrical body aforesaid. A distribution of booths $N^1$ is given as appropriate to an exhibition building of this type, but these are equally applicable as boxes and may be arranged in two tiers when it is intended that the building should be used for such purposes as military tournaments or as a stadium. Subsidiary halls $N^3$ $N^4$ are provided suitable to serve as refreshment bars or dining room and by way of illustration a small cinema theatre or concert room is illustrated at $N^9$. The whole of the booths $N^1$, $N^1$, etc. and halls $N^3$, $N^4$ and $N^9$ communicate with the pressure system and therefore permit of free access with the domed area or ring. An air lock is indicated at $N^{10}$ suitable to give access for large exhibition units such as aeroplanes, etc., or capable of dealing at once with considerable numbers of motorcars, horsemen or troops or for the more rapid evacuation of the building at closing time. In detail the air lock $N^{10}$ comprises a double gateway of sufficient width for whatever purposes may be required, commanded at its ingress and egress by two sets of sliding doors mounted on anti-friction rollers; these doors are arranged in pairs and figures $N^{11}$, $N^{12}$, and $N^{13}$, $N^{14}$ the external doors are shown closed and the internal doors are shown open, the wings $N^{15}$ are not movable but form screens behind which the doors $N^{11}$ and $N^{12}$ are nested when thrown open. The width of the lock internally is conveniently made wider than the ingress and egress apertures in order to permit of convenience in handling difficult units or to give greater capacity when the lock is used for an exit for visitors or such like purposes.

Figure 23:
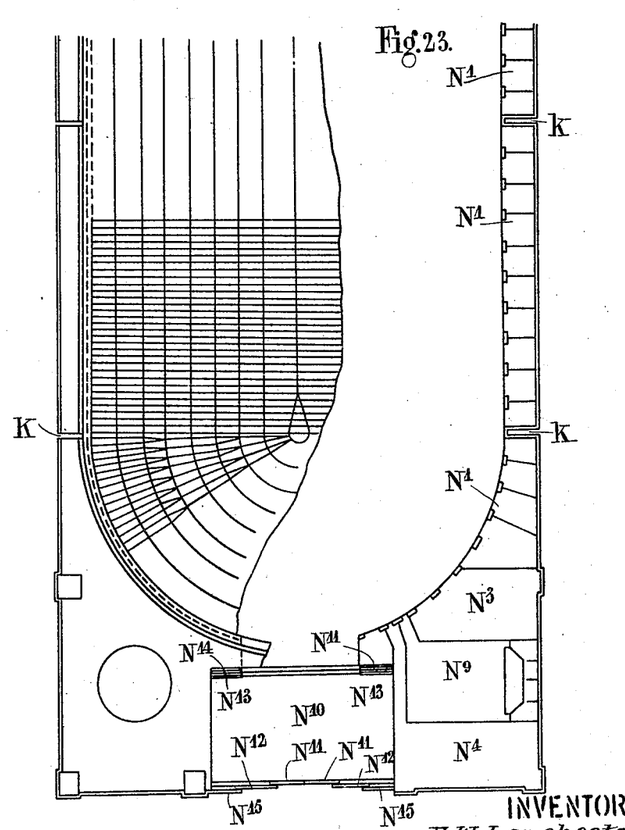

The architectural features as to accommodation, etc., are depicted in Figures 22 and 23 in the barest outline, a suggestion also is given of the sub-division of the building into block units, the continuity of the structure being broken at KK, KK the gaps being sealed by temporary masonry or woodwork in the manner already described. In the structure depicted in Figures 22 and 23 the blocks of buildings flanking the cylindrical portion of the roof require to be sufficiently massive and adequately footed to take the inward tension of the roof members since in this construction there is no other means (as there is in the circular dome) by which the said tension may be otherwise resisted.

The type of roof depicted in Figure 22 closely resembles that described in detail in specification of British Patent 119339 of 1917 already granted to the present applicant.

Although in the examples given in the figures the domes have comprised an arc of less than a hemisphere and in the case of the cylindrical roof less than a semi-circle, such forms being generally more advantageous, it is possible to apply the system to a domed roof of hemispherical form or in which the sides of the roof become vertical. Such a dome gives no resultant component at the anchorage as due to the tension of the roof members but has the disadvantage of requiring more material and requiring a higher internal pressure to resist storms; in other words there is a greater tendency in such a dome for a cave-in to take place due to external wind pressure.

It is further possible to go beyond the hemisphere and to construct a dome of Moorish or Eastern type in which the sides of the roof turn inward and the tension of the roof members has an outward resultant. Domes in imitation of Moorish or Eastern designs may be produced by approximating the curve required in the manner described with reference to Figures 16 and 17. Furthermore shapes or pinnacles of fancy or fantastic form may readily be executed with a facility not attainable by ordinary methods of construction.

The materials used in the case of domes of small size permit of a wide choice, either steel or hemp or manila ropes or hawsers are suitable, the selection depending largely upon the conditions as to permanence required, portability and cost. The fabric generally most appropriate is a closely woven canvas of low permeability dressed as may be required with oil and with an external coating of paint or dope. In some cases a coating of bitumen or tar may be applied. The degree of permeability required in any particular case depends upon the need for ventilation; thus a dome put up for warehouse purposes may be made almost air-tight and a large dome if nearly air-tight may be sustained with a very small expenditure of power.

Generally speaking, and in the case of very large domes especially, the employment of the highest quality of steel rope is indicated, namely rope constructed of what is known as plough wire; also canvas or fabric of the best quality of Egyptian or Sea Island cotton or of linen fiber (flax) may be employed. Balloon fabrics may be used in certain cases, especially where low air permeability is wanted but such fabrics being of comparatively light weight require to be well supported by independent network or by a closer disposition of the ratlins as described with reference to Figure 13. As already stated, for the lantern, where it is required to admit daylight, the fabric may be of transparent or translucent material. In addition to this glazed port holes may be fitted as described in British specification 119339 (1917). Alternatively as already stated translucent canvas or fabric may be employed for the main envelope in which case a very moderate degree of translucency is all that is required, a degree not inconsistent with adequate strength.

The method of roofing buildings in accordance with the present invention is fundamentally different from existing or known prior practice, many of the conditions being inverted. Thus, just as the ordinary roof of a building requires to be supported and forms a load to be carried by the building itself and by the foundation, a roof constructed in accordance with the present invention actually tends to lift the building and may be said to form a negative load. Consequently the footings and foundation are relieved of the major portion of their duty and a considerable economy is effected in the building itself on this account alone quite apart from the reduction of the expenditure on the roof structure. Beyond this there is a very definite limit to the span of a steel roof or a steel dome and this limit has in some of the largest existing structures been approached. There is no definite theoretical limit to the size of a pressure supported roof and the practical limit in any case betokens that a span many times that known to present practice is possible.

Having now described my invention, what I claim as new and desire to secure by Letters Patent is:—

1. A building comprising an endless rigid wall, a substantially dome-shaped flexible roof connected to said wall, and means for introducing an aeriform medium into the enclosure formed by said wall and roof under sufficient pressure to sustain the roof without the aid of interior supports.

2. A building as claimed in claim 1 having roof tension members secured to the roof, and permanent anchorages carried by the wall and attached to said roof tensioning members.

3. A building of the kind defined by claim 1 in which the roof comprises a fabric of low permeability to air retained by net work system of roping having terminal members adapted to be secured to the wall, and an air lock forming a means for entry and exit from the enclosure formed by the wall and roof.

4. A building of the kind defined by claim 1 having roof tension members secured to the roof, permanent anchorages carried by the wall and attached to said roof tensioning members, and an air-lock arranged in the wall and forming a means of entrance and exit to and from the enclosure formed by the wall and roof.

5. A building of the kind defined by claim 1 in which the roof is provided with a retaining rope-work net comprising circumferential members disposed like parallels of latitude and radial members disposed like meridians of longitude, certain of the radial members being bifurcated, and a lantern mounted at the top of the roof and secured to said radial members.

6. A building comprising in combination an endless rigid wall, a flexible roof secured to said wall and sustained in position only by air pressure within the enclosure formed by the wall and roof, said wall consisting of a system of masonry construction comprising a number of sections or blocks mounted on independent foundations and connected by temporary renewable sections.

7. A building of the kind defined by claim 1 in which the wall consists of a reinforced masonry structure including vertical reinforced bars combined with horizontal and vertical bars, and anchorage members secured to said bars and projecting from the wall and forming means to which the roof is attached.

8. A building of the kind defined by claim 1 provided with a passage having a relatively low ceiling so that people entering or leaving the building en masse form in effect a blockage or sealing of the passage and prevent loss of air pressure.

9. A building of the kind defined by claim 1 having a passage provided with a low ceiling and having exit doors arranged at its outer end and adapted to open outwardly.

10. A building of the kind defined by claim 1 in which the wall is provided with a number of arch-shaped portions formed of reinforced masonry, and an anchorage system comprising vertical bars having inverted catenary members to which the roof is adapted to be attached, said catenary members extending across the arch-shaped portions of the wall.

11. A building of the kind defined by claim 1 in which the roof is provided at its top with a lantern having transparent portions to admit light to the enclosure formed by the wall and roof.

12. A structure for use with a flexible roof comprising a hub-shaped member and a rim-shaped member, spoke-shaped members connecting the rim and hub-shaped members, a flexible cover extending over the hub, spoke and rim-shaped members, sealing means secured to the hub-shaped member and engaging the flexible cover, and means carried by the hub-shaped member and adapted to form an anchorage for flexible fabric which extends beyond said rim-shaped members.

13. A building of the kind defined by claim 1 in which, a structural network arranged on the outer side of said roof and comprising circumferential members and radial members secured to each other, a lantern provided at the top of the roof to which the upper ends of the radial members are secured, and means provided on the wall to which the lower ends of the radial members are secured.

14. A building of the kind defined by claim 1 in which, circumferential elements are arranged on the outer side of said roof, and radial elements arranged between the circumferential elements and provided at their ends with loops through which the circumferential members pass.

15. A building of the kind defined by claim 1 in which the lower edge of the roof is provided with a flap which is secured to the inner upper edge portion of the wall for sealing the joint between the wall and roof and preventing the escape of air at this juncture.

16. A building comprising an endless wall formed of independently spaced masonry piers, temporary sections arranged between said piers, metal reinforcements provided in the wall and having anchoring means which extend beyond the wall, a flexible roof having its edge secured to said anchoring means, and means for forcing air into the enclosure formed by said wall and roof for sustaining the roof without the employment of interior supports.

17. A building of the kind defined by claim 16 in which the roof is of substantially dome-shape and is provided at its top with a lantern, and a flexible network cover arranged on the exterior of said roof, secured to said lantern and having portions which engage said anchoring means.

In testimony whereof I have signed my name to this specification.

FREDERICK WILLIAM LANCHESTER.